United States Patent [19]

Kamata et al.

[11] Patent Number: 5,285,894
[45] Date of Patent: Feb. 15, 1994

[54] WATERPROOF CASING

[75] Inventors: Kazuo Kamata; Hisashi Tasaka; Takashi Kubo; Takaji Kono, all of Saitama, Japan

[73] Assignee: Fuji Photo Film Co., Ltd., Kanagawa, Japan

[21] Appl. No.: 5,973

[22] Filed: Jan. 11, 1993

[30] Foreign Application Priority Data

Jan. 9, 1992 [JP] Japan .................... 4-002451

[51] Int. Cl.⁵ .............................................. B65D 85/38
[52] U.S. Cl. ............................... 206/316.1; 206/524.6; 354/64
[58] Field of Search .............. 206/316.1, 316.2, 316.3, 206/525, 524.6; 354/64

[56] References Cited

U.S. PATENT DOCUMENTS

| | | |
|---|---|---|
| 4,882,600 | 11/1989 | Van de Moere . |
| 4,884,087 | 11/1989 | Mochida et al. . |
| 4,972,649 | 11/1990 | Mochida et al. . |
| 4,999,664 | 3/1991 | Foust . |
| 5,153,622 | 10/1992 | Hayakawa et al. ............... 354/64 |
| 5,200,775 | 4/1993 | Yokota ............................... 354/64 |

FOREIGN PATENT DOCUMENTS

| | | |
|---|---|---|
| 2-203329 | 8/1990 | Japan . |
| 3-45535 | 4/1991 | Japan . |
| 3-54922 | 5/1991 | Japan . |
| 3-175435 | 7/1991 | Japan . |
| 3-86338 | 8/1991 | Japan . |
| 4-356 | 1/1992 | Japan . |
| 4-70638 | 6/1992 | Japan . |

Primary Examiner—Jimmy G. Foster
Attorney, Agent, or Firm—Young & Thompson

[57] ABSTRACT

A waterproof casing contains a lens-fitted photographic film unit in a watertight manner so as to take underwater photograph. The waterproof casing is provided with an air flow opening. An air-permeable waterproof sheet is attached to the air flow opening form the inside so that air can pass through the sheet freely so as to regulate the internal pressure of the waterproof casing but water will not enter the waterproof casing. In a preferred embodiment, the waterproof casing consists of a transparent main body with a bottom opening and a bottom lid. The air flow opening is formed os as to be covered by a film winding knob of the waterproof casing. Structure to be fitted in the bottom opening is formed with another air flow opening to which the air-permeable waterproof sheet is attached. Outside this structure is disposed a waterproof sheet having an opening at a position facing the air flow opening of this structure. The waterproof sheet is covered by the bottom lid.

24 Claims, 7 Drawing Sheets

WATERPROOF CASING

BACKGROUND OF THE INVENTION

1. Field of the Invention

The present invention relates to a waterproof casing, and more particularly to a waterproof casing suitable for housing an underwater camera.

2. Description of the Prior Art

Various equipment used in the water or rain are protected by waterproof casings. For example, in the field of photography, underwater cameras are commercially available, wherein a lens-fitted photographic film unit (hereinafter simply referred to as film unit) with a photographic film preloaded therein is encased in a waterproof casing. As is well know, the film unit consists of a film housing equipped with a simple photograph-taking mechanism and an outer casing formed of cardboard covering the film housing.

Such an underwater camera can take photographs at a depth of up to 2 to 3 meters, or in other moist environment such as in the rain or snow. The waterproof casing is constituted of a transparent box-shaped casing body and a lid, both molded from plastic, and is completely sealed. The film unit can be operated from outside the waterproof casing, since the waterproof casing is provided with operating portions for engagement with corresponding operating portions of the film unit. After all the frames are exposed, the underwater taking camera is forwarded to a photo laboratory, as it is, for photofinishing. The developed photographic film and resultant photoprints are returned to the user, but the waterproof casing and the film unit are not returned to the user.

In such a waterproof casing containing a film unit, when the ambient temperature changes, its internal pressure changes because of expansion or contraction of the air inside thereof. The change of the internal pressure causes failure of the film unit, or deformation of the waterproof casing, the deformation resulting in mechanical disconnection between the film unit and the waterproof casing.

In order to solve such problems, a pressure-control valve can be used for controlling the internal pressure of the waterproof casing. However, such a valve is expensive and requires a space for attachment, and so is not suitable for an underwater taking camera having a film unit.

Waterproof casings have been suggested in Japanese Utility Model Publ. No. 4-356 and Japanese Utility Model Laid-open Publn. Nos. 3-45535, 3-86338 and 4-70638, in which the internal pressure of the waterproof casing is controlled while overcoming the above problems of cost, space, etc. Such a waterproof casing is formed with an air flow opening which is covered by an air-permeable waterproof sheet. Air can pass but water cannot pass through the air-permeable waterproof sheet. However, the air-permeable waterproof sheet is a thin film formed of polymer, and so is easily torn. Furthermore, the air-permeable waterproof sheet is always exposed to the outside of the waterproof casing, so if a very thin and strong wire or the like were inserted into an air flow opening, the very thin air-permeable waterproof sheet (which is only several microns thick) would be pierced and torn.

OBJECTS OF THE INVENTION

It is therefor an object of the present invention to provide a waterproof casing in which a sturdy air-permeable waterproof sheet adapted to be handled with ease is attached to an air flow opening.

It is another object of the present invention to provide a waterproof casing in which an air-permeable waterproof sheet is protected so as not to be torn.

SUMMARY OF THE INVENTION

In order to achieve the above and other objects, a waterproof casing according to the present invention is formed with an air flow opening which is shielded on its inner side by an air-permeable waterproof sheet. The air-permeable waterproof sheet is formed of a thin polymer film and a supporting member laminated on the film and disposed such that the film faces outward. The film has the property that air passes therethrough but water will not pass therethrough. On the other hand, both air and water can pass through the supporting member. The air-permeable waterproof sheet is protected by an operating member of the equipment thus housed, so as not to be torn.

In a preferred embodiment of the present invention, an air flow opening is formed in a portion of a main body covered by an operating member of the housed equipment and is shielded by the air-permeable waterproof sheet. The air-permeable waterproof sheet may be formed of a polymer film alone, but may also be formed of a polymer film and a supporting member laminated thereon to provide a double-layer construction.

In another preferred embodiment, an air flow opening is formed in a positioning frame for supporting the bottom surface of the film unit, and is shielded by an air permeable waterproof sheet. A waterproof sheet is positioned under the positioning frame and attached to the bottom of the main body of the waterproof casing. The waterproof sheet is formed with an opening at a position facing the air flow opening of the air-permeable waterproof sheet. After a spacer sheet is applied to the waterproof sheet attached to the main body of the waterproof casing, a bottom lid is fitted on the main body.

According to the present invention, the air-permeable waterproof sheet is formed by laminating a supporting member such as a fabric on a thin polymer film, so that the waterproof sheet has sufficient body to be handled with ease. Furthermore, because the air flow opening is formed in the portion of the main body covered by the operating member or in a portion of the positioning frame and shielded by the air-permeable waterproof sheet, the internal pressure of the waterproof casing can be controlled automatically and the air-permeable waterproof sheet can be protected from damage due to harm from the outside. Because the air-permeable waterproof sheet is attached to the main body by heat welding or solvent, it is possible to reduce the number of parts needed for attaching the air-permeable waterproof sheet.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
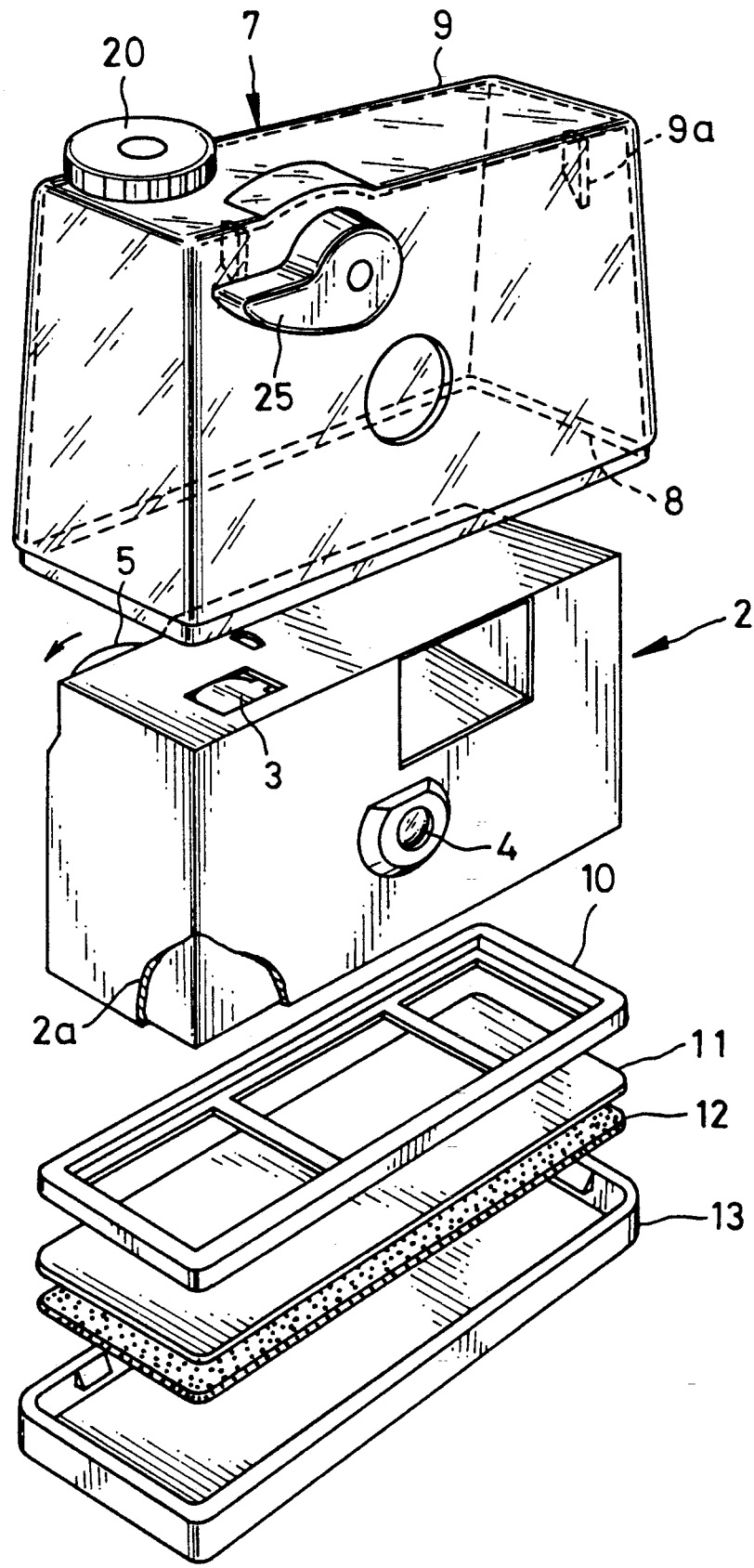
FIG. 1 is an exploded perspective view of an underwater taking camera having a waterproof casing and a lens-fitted photographic film unit according to the present invention.
Figure 2:
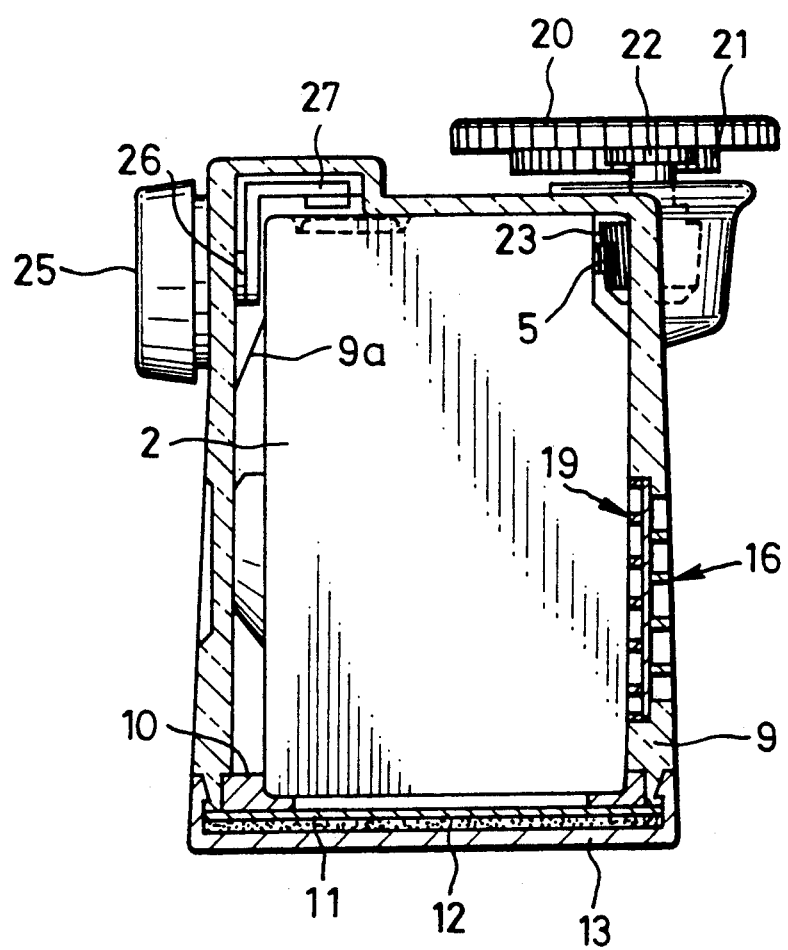
FIG. 2 is a cross-sectional side view of the underwater taking camera of FIG. 1.

FIGS. 1 and 2 illustrate an underwater camera in a waterproof casing 7 according to the present invention. The underwater camera consists of the waterproof casing 7 and a lens-fitted photographic film unit 2 encased in the waterproof casing 7. The film unit 2 is preloaded with a 35 mm-type photographic film with a cassette (not shown). Upon depression of a shutter release button 3 provided on the top portion of the film unit 2, a photograph is taken through a taking lens 4. Winding of the photographic film is performed by rotation of a film advancing wheel 5 in the direction indicated by an arrow. Gear-like irregularities are formed on the periphery of the film advancing wheel 5 so as to prevent the fingers from slipping thereon when rotating it. The film unit 2 is enclosed in an outer casing 2a having openings where needed. The basic structure of the film unit 2 is disclosed in U.S. Pat. Nos. 4,884,087 and 4,972,649.

The waterproof casing 7 is of box shape and consists of a transparent main body 9 with a bottom opening 8, a plastic positioning frame 10 to be fitted in the bottom opening 8, a waterproof sheet 11 formed of a waterproof and moisture-proof plastic film, a spacer sheet 12 formed of a foamed plastic sheet, and a black plastic bottom lid 13. The film unit 2 is inserted in the main body 9 through the bottom opening 8. After insertion of the film unit 2 in the main body 9, the positioning frame 10 is fitted in the bottom opening 8 to position the bottom of the film unit 2. The upper portion of the film unit 2 is positioned by ridges 9a which are formed on the upper inside surface of the main body 9. Thereafter, the waterproof sheet 11 is attached by heat to the edge of the bottom opening 8 to seal the inside of the main body 9 hermetically. Finally, the spacer sheet 12 is inserted into the bottom lid 13, which is then attached to the main body 9. The structure of the underwater camera is disclosed in detail in U.S. patent applications Ser. No. 07/830,878 filed Jan. 4, 1992 and Ser. No. 07/890,774 filed Jun. 1, 1992.

A knob 20 is mounted on the upper surface of the main body 9. Rotation of the knob 20 is transmitted to a coupling gear 23 via gears 21 and 22. The coupling gear 23 is in mesh with the film advancing wheel 5. A shutter release operating lever 25 is rotatably mounted on the front surface of the main body 9. A crank-shaped push lever 27 is formed integrally with the shutter release operating lever 25 via a shaft portion 26 penetrating the main body 9. When the lever 25 is rotated counterclockwise in FIG. 1, the push lever 27 pushes the shutter release button 3.

The material for the waterproof sheet 11 is selected from e.g., polyethylene, polypropylene, polystyrene, polyvinyl chloride, polyvinylidene chloride, polyacrylonitrile, polyvinyl acetate, urethane resin, urea resin, melamine resin, phenolic resin, epoxy resin, fluorine plastic such as tetrafluoroethylene and polyvinylidene fluoride, rubber such as butadiene rubber, chloroprene rubber and natural rubber, acrylic acid or methacrylate ester such as polymethyl methacrylate and polyethyl acrylate, polyester resin such as polyethylene terephthalate, polyamide resin such as nylon 6, nylon 66, cellulose resin such as cellulose triacetate, a water-insoluble polymer such as silicone resin, or derivatives of these.

Furthermore, the waterproof sheet 11 may be a homopolymer composed of one kind of monomer or a copolymer of two or more kinds of monomers. It may preferably be a copolymer of alkyl acrylate or alkyl methacrylate and acrylic acid or methacrylic acid (5 mol % or less of acrylic acid or methacrylic acid is desirable), styrene-butadiene copolymer, styrene-butadiene-acrylic acid copolymer (5 mol % or less of acrylic acid is desirable), styrene-butadiene-divinylbenzene-methacrylic acid copolymer (5 mol % or less of methacrylic acid is desirable), vinyl acetate-ethylene-acrylic acid copolymer (5 mol % or less of acrylic acid desirable), vinylidene chloride-acrylonitrile-methyl methacrylate-ethyl acrylate-acrylic acid copolymer (5 mol % or less of acrylic acid is desirable), ethyl acrylate-glycidyl methacrylate-acrylic acid copolymer and so forth.

Figure 3:
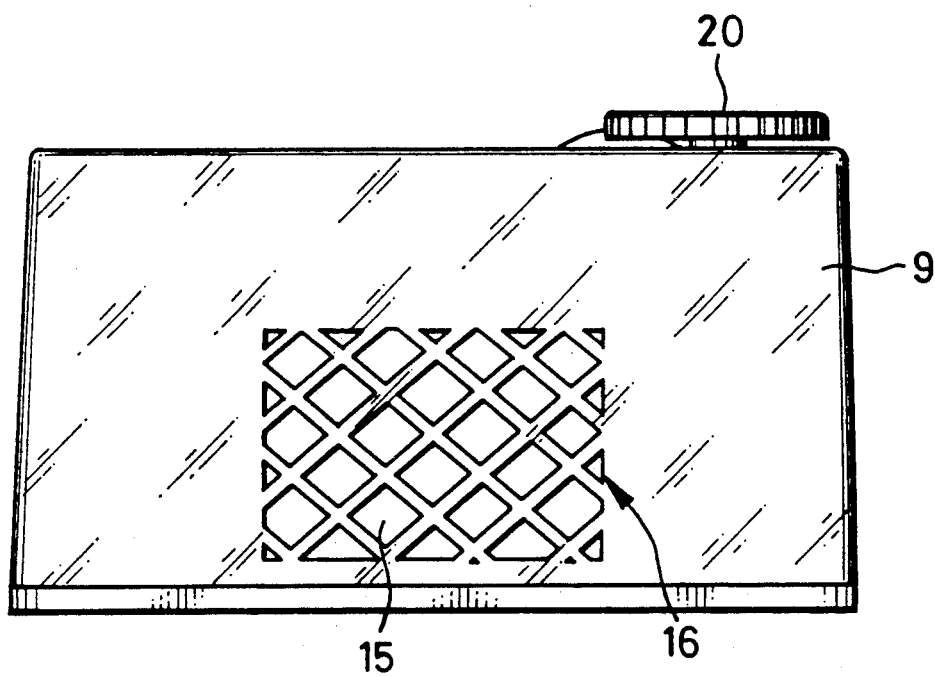
FIG. 3 is a rear view thereof.
Figure 4:
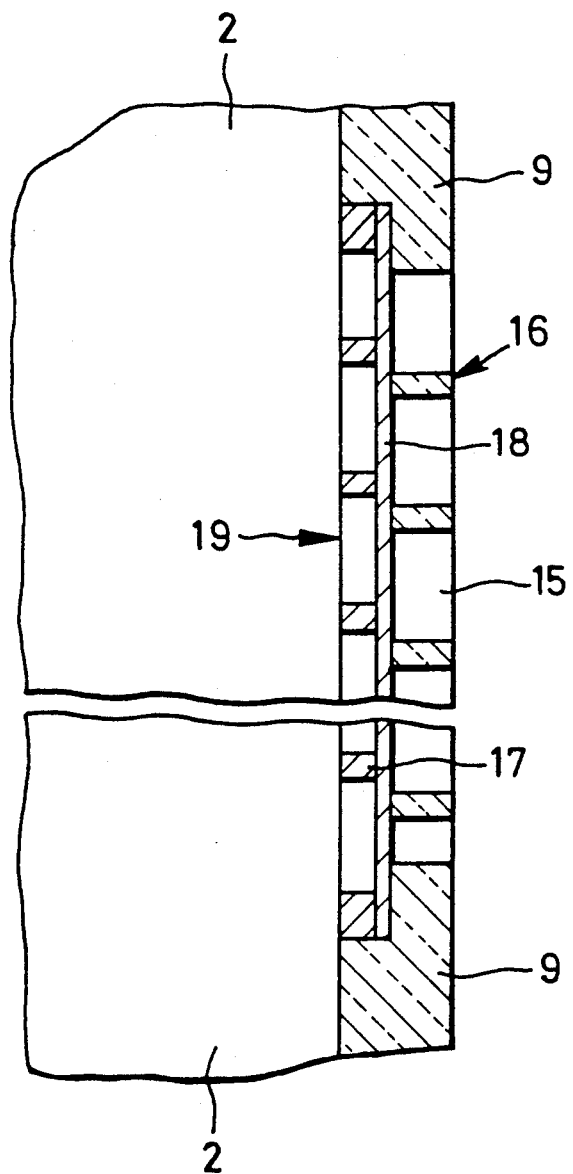
FIG. 4 is an enlarged fragmentary sectional view of a wall of the underwater taking camera.

As illustrated in FIG. 3, the rear surface of the main body 9 is formed with an air flow opening 16 comprised by a plurality of small holes 15 of rhombic shape. The shape of the holes 15 may be circular, triangular, square or the like. As illustrated in FIG. 4, an air-permeable waterproof sheet 19 is attached to the air flow opening 16 from the inside in order to control the internal pressure of the waterproof casing 7. The air-permeable waterproof sheet 19 consists of a supporting member 17 such as a non-woven fabric having a mesh construction and a thin film 18 having a number of extremely small holes through which air passes but water will not pass. Since the thin film 18 is laminated with the supporting member 17, the air-permeable waterproof sheet 18 is sufficiently sturdy to enable easy handling and attachment thereof to the waterproof casing 7.

The air-permeable waterproof film 18 is a thin film which is made by drying water-dispersed acrylic resin. This thin film can also be made by drying acrylic resin dissolved in solvent medium. The water-dispersed acrylic resins include Primal AC61, LC40, Jacryl C21, NC235 (made by Japan Acryl Chemical Company), Vinybran 2598 (made by Nisshin Chemical Engineering Company), Poncoat 4280, R3370, AC503, FS141 (made by Dainippon Ink and Chemicals, Inc.), Cest bien 4722, 55125, 4719, 4724, 4635, 45125, 46728 (made by Daicel Chemical Industries, Ltd.), Julymer AT613, SEK301, ET-410, SEK310EA (Japan Junyaku Company), T371, AE362, 621, 932, 934 (made by Japan Synthetic Rubber Co., Ltd.) Polyzol AT2000, AP3000, AP6720, AP6730 (made by Showa Highpolymer Co., Ltd.)

The acrylic resin can be a copolymer of two or more kinds of vinyl monomers, which may be copolymerized with an acid component such as acrylic acid, methacrylic acid, maleic acid, itaconic acid, citraconic acid, crotonic acid, fumaric acid or maleic anhydride, as desired. An acrylic resin composed of acrylic acid or methacrylate ester is most suitable for the film 18.

As vinyl monomers, there may be mentioned ethylene, propylene, 1-butene, isobutene, vinyl chloride, vinylidene chloride, styrene, α-methyl styrene, chloromethyl styrene, vinyl ketone, unsaturated aliphatic acid monoethylene ester (e.g., vinyl acetate, allyl acetate), unsaturated ethylene monocarboxylic acid or dicarboxylic acid substituted alkyl radical ester (e.g., 2-hydroxymethyl acrylate, 2-hydroxyethyl methacrylate, 3-hydroxypropyl acrylate, 3-hydroxypropyl methacrylate, 2-N,N-dimethylaminoethylmethacrylate, glycidyl methacrylate), unsaturated ethylene monocarboxylic acid or dicarboxylic acid amide (e.g., N,N-dimethyl acrylamide, N-methylol acrylamide, N-methoxymethyl acrylamide, N,N-diethyl acrylamide), unsaturated monoethylene compounds (e.g., acrylonitrile, methacrylonitrile) or diene groups (e.g., butadiene, isoprene).

Acrylic resin is also used as the binder for the thin film, and is a high molecular weight polymer having at least one group as a repeating unit in the molecule, e.g.:

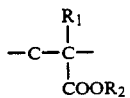

wherein $R_1$ is alkyl having 1 to 5 carbon atoms, and $R_2$ is alkyl having 1 to 12 carbon atoms.

The acrylic resin used as the binder includes e.g., methyl acrylate, ethyl acrylate, isopropyl acrylate, n-butyl acrylate, isobutyl acrylate, amyl acrylate, n-hexyl acrylate, 2-ethylhexyl acrylate, lauryl acrylate, methyl methacrylate, ethyl methacrylate, isopropyl methacrylate, n-butyl methacrylate, isobutyl methacrylate, amyl methacrylate, n-hexyl methacrylate, 2-ethylhexyl methacrylate, and lauryl methacrylate.

The function of the above-structured waterproof casing 7 will now be described. When the underwater camera is subjected to high temperature, the air temperature inside the waterproof casing 7 rises to cause the internal air to expand. Because the air passes through the film 18 of the air-permeable waterproof sheet 19 and is exhausted from the holes 15 of the air flow opening 16, the internal pressure of the waterproof casing 7 will not rise but will be kept constant. On the other hand, when the air temperature inside the waterproof casing 7 falls, the ambient air enters the waterproof casing 7 so that the internal pressure will not fall but will be kept constant. Furthermore, although the underwater camera is submerged during underwater photography, water will not enter the waterproof casing 7 since the film 18 is watertight.

In the above embodiment, the air flow opening 16 is formed on the rear surface of the main body 9, but may be omitted if an air-permeable waterproof sheet is used as the waterproof sheet 11. In this case, air enters the waterproof casing 7 through a gap (not shown) between the bottom lid 13 and the main body 9 and passes through the air-permeable waterproof sheet 11.

Furthermore, if the air-permeable waterproof sheet 19 is exposed to the outside of the waterproof casing 7, then if a needle or a wire happens to enter, e.g. the small holes 15, a hole would be formed in the air-permeable waterproof sheet 19, which would impair its waterproof function. In order to protect the air-permeable waterproof sheet 19, therefore, it can be located on the inner side of a member to be mounted on the waterproof casing so as to be hidden by that member.

Figure 5:
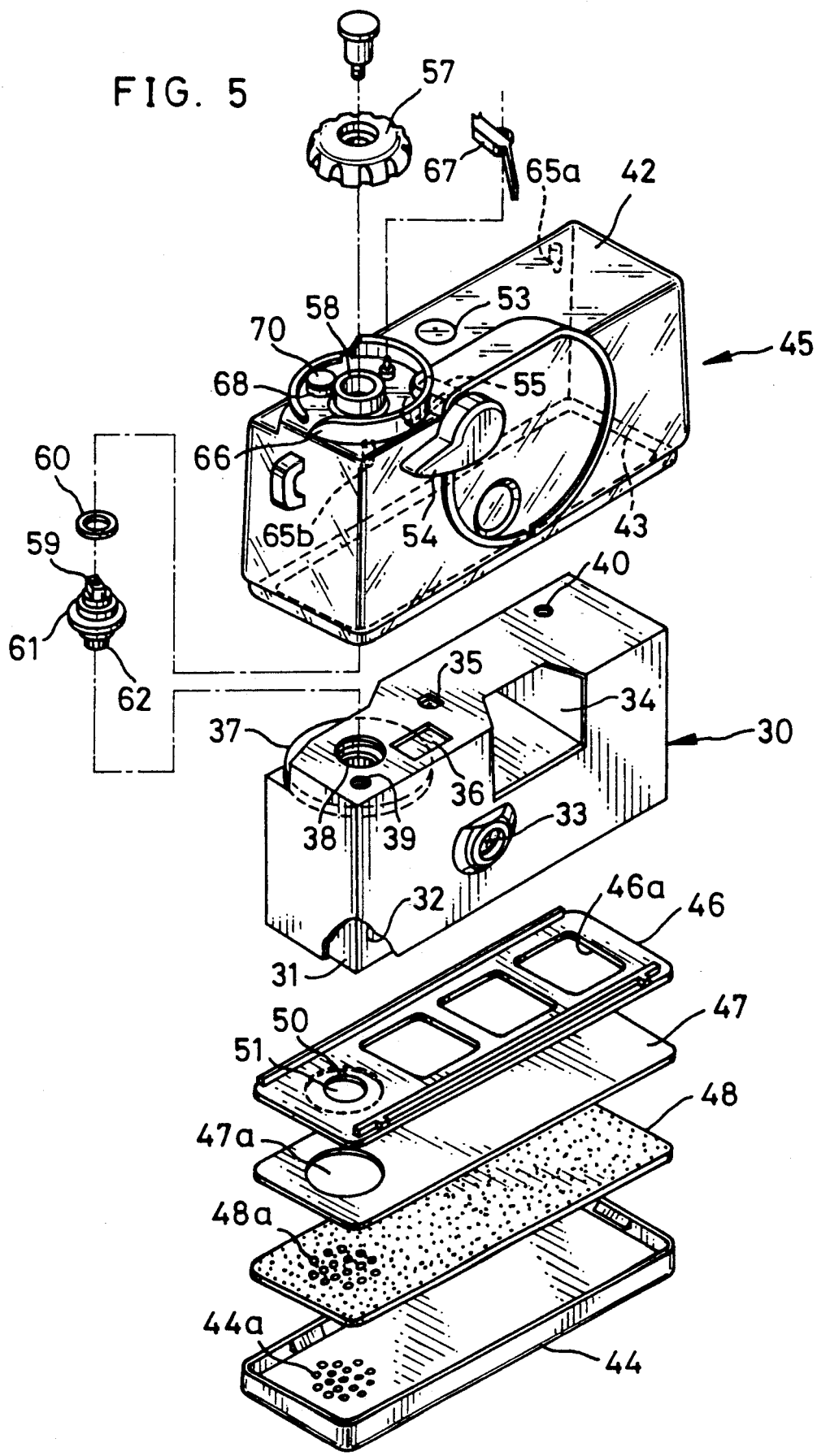
FIG. 5 is an exploded perspective view of another embodiment of an underwater taking camera according to the present invention in which an air-permeable waterproof sheet is attached to a positioning frame, and another such sheet is disposed in a protected position under a film winding knob.
Figure 6:
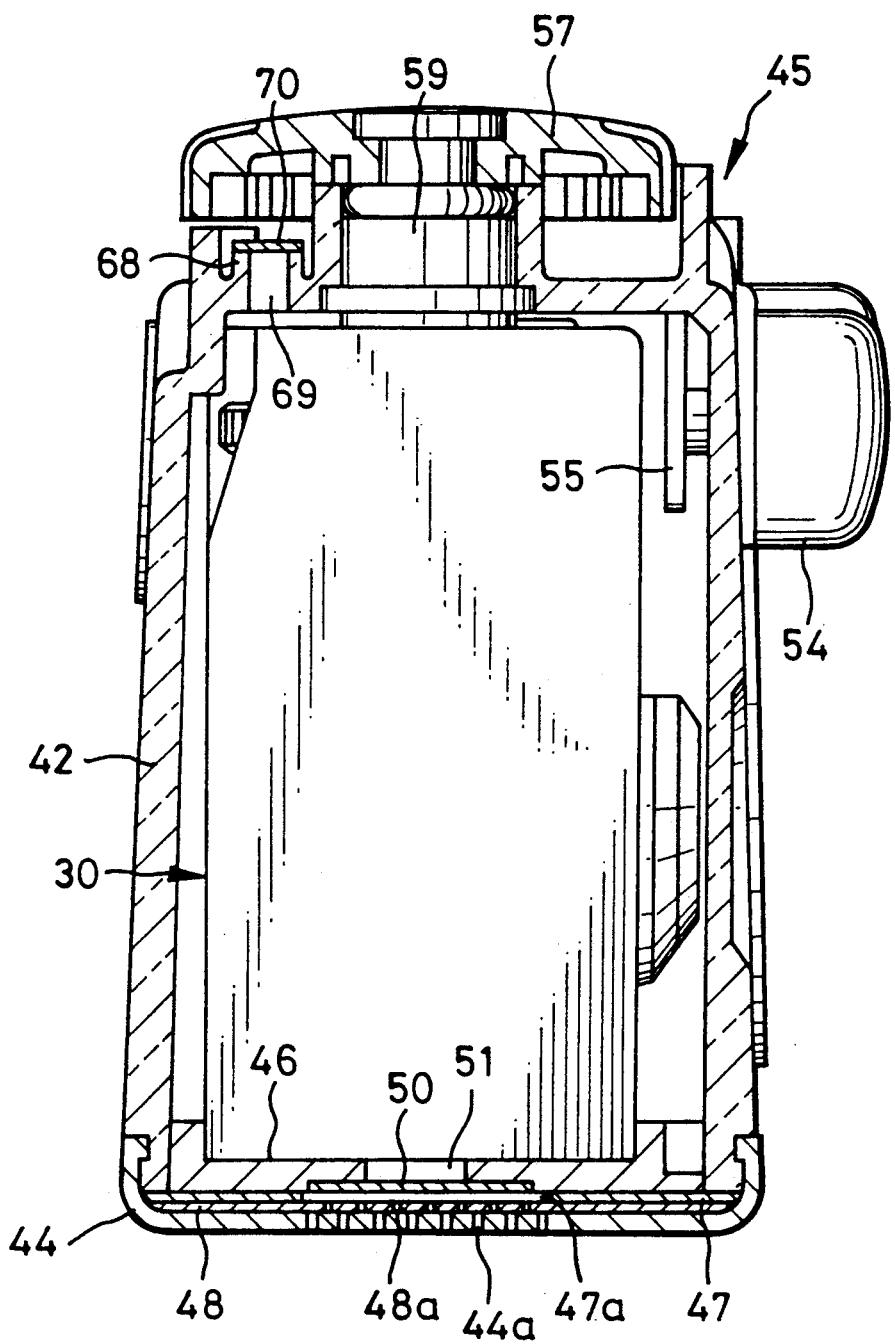
FIG. 6 is a cross-sectional view of the underwater taking camera of FIG. 5.

This latter arrangement is illustrated in FIGS. 5 and 6, wherein air flow openings are formed in a portion of the main body covered by the film winding knob, and covered by the positioning frame, these openings being shielded by air-permeable waterproof sheets. A lens-fitted photographic film unit 30 consists of a film housing 31 and an outer casing 32 for covering the film housing 31. The film housing 31 has a photographic film and a shutter mechanism, etc. incorporated therein. The outer casing 32 is formed as needed with openings for exposing a taking lens 33, a viewfinder window 34, a film frame counter window 35, a shutter release button 36 and the like.

The film unit 30 is so formed as to be encased in a waterproof casing 45. A hole 38 is formed in the center of a film advancing wheel 37 incorporated in the film housing 31 and knurled teeth are formed in the inside periphery of hole 38. The upper surface of the film unit 30 is provided with holes 39 and 40 which are positioned approximately on a diagonal line and penetrate the outer casing 32 and the film housing 31.

The film unit 30 is inserted from a bottom opening 43 into a main body 42 formed of transparent plastic. A bottom lid 44 is fitted on the bottom opening 43 to contain the film unit 30 in the waterproof casing 45. After inserting a positioning frame 46 in the bottom opening 43, casing 45 about the bottom opening 43 is attached to a waterproof sheet 47 by heat sealing. A spacer sheet 48 of foamed plastic is laid on the inside surface of the bottom lid 44.

As illustrated in FIG. 6, an air flow opening 50 is formed in the positioning frame 46 and a recess is formed in the positioning frame 46 on the side of the bottom lid 44 so as to surround the air flow opening 50. An air-permeable waterproof sheet 51 is attached about its periphery to the recess. The air-permeable waterproof sheet 51 is attached to the positioning frame 46 by melting the plastic positioning frame 46 by heat or solvent to cause the melted plastic to permeate the air-permeable waterproof sheet 51 and to harden. The air-permeable waterproof sheet 51 may be formed of the above-described thin film alone, or may be formed of the thin film and the above-described fabric laminated on the film.

An opening 47a larger than the air flow opening 50 is formed in the waterproof sheet 47. A peripheral portion of the opening 47a of the waterproof sheet 47 is attached to the positioning frame 46 by heat sealing, so that water will not enter the inside of the main body 42 through the opening 47a and openings 46a. Of course, the waterproof sheet 47 may be adhered to the entire surface of the positioning frame 46 as well as to the edge of the bottom opening 43.

The spacer sheet 48 and the bottom lid 44 are provided on respective portions corresponding to the opening 47a with a plurality of small holes 48a, 44a. The holes 48a of the spacer sheet 48 are displaced from the respective holes 44a of the bottom lid 44, so that even if a needle or wire were inserted through the holes 44a, it would be intercepted by the spacer sheet 48 which thus would prevent the air-permeable waterproof sheet 51 from being pierced.

The main body 42 has a relatively thin portion facing the taking lens 33 of the film unit 30 in the waterproof casing 45 and the outside and inside surfaces of the thin portion are parallel to the front surface of the film unit 30, for maximum light transmission and hence optimum picture taking. The upper surface of the main body 42 is provided at a portion corresponding to the film frame counter window 36 of the film unit 30 with a lens 53 so as to enable observing the exposed frames counter window 35 under magnification.

The front surface of the main body 42 is provided with a shutter release operating lever 54 formed of opaque plastic. The lever 54 is connected via a shaft to a rotary member 55 mounted inside the main body 42. Depression of the lever 54 causes the rotary member 55 to depress the shutter release button 36 of the film unit 30 contained in the main body 42. After the user releases the lever 54, the rotary member 55 and the lever 54 are returned to their respective initial positions by a coil spring (not shown).

A knob 57 formed of opaque plastic is mounted on the upper surface of the main body 42. The knob 57 is mounted on a rotary shaft 59 inserted in a boss 58 formed on the upper surface of the main body 42. An 0-ring is fitted on the rotary shaft 59 so as to prevent water from entering the main body 42 during underwater photographing. A torque limiter 61 is connected to the rotary shaft 59 and is also provided with a drive shaft 62 whose periphery has knurled teeth for engagement with the knurled teeth formed on the inner periphery of the hole 38 of the film advancing wheel 37. The torque limiter 61 transmits rotation of the knob 57 to the drive shaft 62 but lets the knob 57 rotate idly when more than a predetermined load is applied thereto. Therefore, when the photographic film is wound by an amount corresponding to a frame and a wind-stop mechanism (not shown) of the film unit 30 is actuated, the knob 57 only rotates idly.

Two tapered pins 65a, 65b are formed on the upper inside surface of the main body 42. When the film unit 30 is inserted from the bottom opening 43 into the main body 42, the tapered pins 65a, 65b enter the respective holes 39 and 40 to guide and position the film unit 30. An annular ridge 66 is formed integrally with the upper surface of the main body 42 so as to surround the knob 57. The ridge 66 is partially cut off on the rear side of the main body 42 so as to expose a portion of the knob 57.

A pawl 67 is formed between the ridge 66 and the boss 58 so as to engage with ratchet teeth (see FIG. 6) formed on the inside surface of the knob 57. The knob 57 is rotated counterclockwise but cannot be rotated clockwise due to the pawl 67. A projection 68 is formed between the ridge 66 and the boss 58. An air flow opening 59 is formed in the center of the projection 68. As illustrated in FIG. 6, an air-permeable waterproof sheet 70 is attached to the projection 68 so as to shield the air flow opening 69. Attachment of the air-permeable waterproof sheet 70 to the projection 68 may be performed by heat or solvent the same as in the case of the air-permeable waterproof sheet 51.

Figure 7:
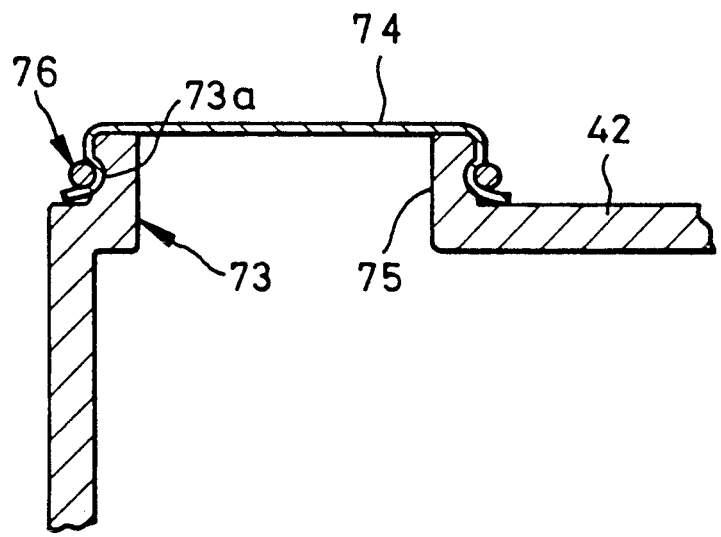
FIG. 7 is a cross-sectional view illustrating an example of structure for attaching the air-permeable waterproof sheet.

As illustrated in FIG. 7, an air-permeable waterproof sheet 74 may be attached by an 0-ring 76 other than by heat or solvent. In this case, the outer surface of a projection 73 is formed with a groove 73a. After covering an air flow opening 75 of the projection 73 with the air-permeable waterproof sheet 74, the 0-ring is fitted in the groove 73a. Since the air-permeable waterproof sheet 74 is thin and small, it tends to be easily torn when attaching it by welding. When the air-permeable waterproof sheet 74 is torn, the whole waterproof casing becomes a defective product. Therefore, it is advantageous to use the 0-ring 76 for the attachment, because then a torn air-permeable waterproof sheet 74 can be easily replaced.

In the above embodiments, when the internal temperature of the waterproof casing 45 rises due to the temperature of hands, or weather conditions, air inside the waterproof casing 45 expands and tends to raise the internal pressure thereof. But thanks to the present invention, a portion of the expanded air is exhausted to the outside of the waterproof casing 45 through the air-permeable waterproof sheet 70 and the air flow opening 69. Alternatively or additionally, a portion of the expanded air is exhausted from the air flow opening 50 formed in the positioning frame 46 through the air-permeable waterproof sheet 51, the opening 47a of the waterproof sheet 47, the small holes 48a of the spacer sheet 48, and the small holes 44a of the bottom lid 44, to the outside of the waterproof casing 45. Because the air-permeable waterproof sheets 51 and 70 have a property that they let air but not water pass therethrough, water will not enter the inside of the waterproof casing 45.

On the other hand, when the ambient temperature of the waterproof casing 45 drops, the outside air enters through the air-permeable waterproof sheets 51 and/04 70. Thus, air exhaust and intake are performed automatically notwithstanding the change of the ambient temperature, so that the internal pressure of the waterproof casing 45 is always kept constant.

In this embodiment, as previously indicated, two air flow openings 50 and 69 are provided; but one of them may be omitted.

The above description is directed to housing an underwater camera, but the waterproof casing of the present invention may be used for containing other equipment such as lighting devices, video cameras, etc.

Although the present invention has been fully described by way of preferred embodiments thereof with reference to the accompanying drawings, various changes and modifications will be apparent to those having skill in this field. Therefore, unless otherwise these changes and modifications depart from the scope of the present invention, they should be construed as being included therein.

What is claimed is:

1. A waterproof casing for containing equipment in a watertight manner, comprising:
   an air flow opening formed in said waterproof casing; and
   an air-permeable waterproof sheet formed of a film and a supporting member and attached to an inside surface of said waterproof casing with said film closing said air flow opening, said film being adapted to let air but not water pass therethrough and said supporting member being adapted to let both air and water pass therethrough.

2. A waterproof casing as defined in claim 1, wherein said supporting member is a non-woven fabric having a mesh construction.

3. A waterproof casing as defined in claim 2, wherein said film is made of acrylic resin.

4. A waterproof casing as defined in claim 1, wherein said supporting member is on the side of said film opposite said air flow opening.

5. A waterproof casing for containing a lens-fitted photographic film unit so as to perform underwater photography, comprising:
- a box-shaped main body for containing said film unit, said main body having a bottom opening through which said film unit is inserted;
- a first waterproof sheet sealing said bottom opening in a watertight manner;
- a bottom lid attached to said main body so as to protect said first waterproof sheet;
- an air flow opening formed in said main body; and
- an air-permeable waterproof sheet formed of a film and a supporting member and attached to an inside surface of said waterproof casing with said film closing said air flow opening, said film being adapted to let air but not water pass therethrough and said supporting member being adapted to let both air and water pass therethrough.

6. A waterproof casing as defined in claim 5, wherein said air flow opening is formed on a rear surface of said main body.

7. A waterproof casing as defined in claim 6, wherein said supporting member is a non-woven fabric having a mesh construction.

8. A waterproof casing as defined in claim 7, wherein said film is made of acrylic resin.

9. A waterproof casing as defined in claim 5, wherein said supporting member is on the side of said film opposite said air flow opening.

10. A waterproof casing for containing a lens-fitted photographic film unit so as to perform underwater photography, comprising:
- a box-shaped main body having a bottom opening through which said film unit is inserted in said main body;
- fixing means for fixing said film unit within said main body, said fixing means being fitted in said bottom opening;
- an air flow opening formed in said fixing means;
- an air-permeable waterproof sheet formed of a film and a supporting member for sealing said bottom opening outwardly of said fixing means in a watertight manner, said film being adapted to let air but not water pass therethrough and said supporting member being adapted to let both air and water pass therethrough; and
- a bottom lid attached to said main body so as to protect said air-permeable waterproof sheet.

11. A waterproof casing for containing photographic equipment in a watertight manner, comprising:
- operating means mounted on the outside surface of said waterproof casing for operating said equipment from outside of said waterproof casing;
- an air flow opening formed in said waterproof casing at a position where said air flow opening is covered by said operating means; and
- an air-permeable waterproof sheet for sealing said air flow opening, said air-permeable waterproof sheet being adapted to let air but not water pass therethrough and being protected by said operating means.

12. A waterproof casing as defined in claim 11, said casing comprising a transparent and box-shaped main body, a bottom opening for inserting said photographic equipment in said main body and a bottom lid for closing said bottom opening.

13. A waterproof casing as defined in claim 12, further comprising:
- fixing means fitted in said bottom opening for fixing said lens-fitted photographic film unit within said main body;
- a second air flow opening formed in said fixing means;
- a second air-permeable waterproof sheet adapted to let air but not water pass therethrough and sealing said second air flow opening; and
- a waterproof sheet which seals said bottom opening at a position inside said bottom lid in a watertight manner and is formed with an opening at a position facing said second air flow opening.

14. A waterproof casing as defined in claim 13, wherein said bottom lid is formed with at least one small opening at a position facing said opening of said waterproof sheet.

15. A waterproof casing as defined in claim 14, further comprising a spacer sheet inside said bottom lid for pressing said waterproof sheet.

16. A waterproof casing as defined in claim 11, wherein said photographic equipment is a lens-fitted photographic film unit having a photograph-taking function.

17. A waterproof casing as defined in claim 11, wherein said operating means is a film winding knob disposed on an upper surface of said casing.

18. A waterproof casing as defined in claim 11, wherein said air flow opening is formed in a projection on said casing, said air-permeable waterproof sheet covering a free end of said projection and being fixed by a ring.

19. A waterproof casing as defined in claim 11, wherein said air flow opening is formed in a projection on said casing, on a free end of which projection said air-permeable waterproof sheet is attached in a watertight manner.

20. A waterproof casing for containing photographic equipment so as to perform underwater photography, comprising:
- a box-shaped main body having a bottom opening through which said film unit is inserted in said main body;
- fixing means fitted in said bottom opening for fixing said photographic equipment within said main body;
- an air flow opening formed in said fixing means;
- an air-permeable waterproof sheet adapted to let air but not water pass therethrough and sealing said air flow opening;
- a waterproof sheet formed with an opening at a position facing said air flow opening for sealing said bottom opening in a watertight manner; and
- a bottom lid fitted on said main body from over the last-named said waterproof sheet.

21. A waterproof casing as defined in claim 20, wherein said photographic equipment is a lens-fitted photographic film unit having a photograph-taking function.

22. A waterproof casing as defined in claim 20, wherein a peripheral area of said opening of said waterproof sheet is attached to said fixing means so as to prevent water from entering said waterproof casing.

23. A waterproof casing as defined in claim 20, wherein said bottom lid is formed with at least one small opening at a position facing said opening of said waterproof sheet.

24. A waterproof casing as defined in claim 20, further comprising a spacer sheet inside said bottom lid for pressing said waterproof sheet.

* * * * *